Sept. 8, 1953      W. B. HEINZ      2,651,317
PRESSURE MODULATING RELAY Filed Oct. 30, 1944      9 Sheets-Sheet 1

WITNESS:

INVENTOR
Winfield B. Heinz
BY
ATTORNEYS.

Sept. 8, 1953 W. B. HEINZ 2,651,317
PRESSURE MODULATING RELAY
Filed Oct. 30, 1944 9 Sheets-Sheet 4

WITNESS:

INVENTOR
Winfield B. Heinz
BY
ATTORNEYS.

Sept. 8, 1953 W. B. HEINZ 2,651,317
PRESSURE MODULATING RELAY
Filed Oct. 30, 1944 9 Sheets-Sheet 5

WITNESS:
Rob P Mitchel.

INVENTOR
Winfield B. Heinz
BY
Busser + Harding
ATTORNEYS.

Sept. 8, 1953  W. B. HEINZ  2,651,317
PRESSURE MODULATING RELAY
Filed Oct. 30, 1944  9 Sheets-Sheet 6

WITNESS:
Rob P Kitchel

INVENTOR
Winfield B. Heinz
BY
Busser + Harding
ATTORNEYS.

Sept. 8, 1953 W. B. HEINZ 2,651,317
PRESSURE MODULATING RELAY
Filed Oct. 30, 1944 9 Sheets-Sheet 9

FIG.23.

WITNESS:

INVENTOR
Winfield B. Heinz
BY
ATTORNEYS.

Patented Sept. 8, 1953

2,651,317

UNITED STATES PATENT OFFICE 2,651,317

PRESSURE MODULATING RELAY

Winfield B. Heinz, Bound Brook, N. J., assignor, by mesne assignments, to Penn Industrial Instrument Corporation, a corporation of Pennsylvania Application October 30, 1944, Serial No. 561,073

16 Claims. (Cl. 137—84)

This invention relates to fluid pressure devices adapted for the production of pressures which are functions of one or more variables and which may be utilized either for indication purposes or for control purposes or both.

The amplification of fluid pressures, using this term in a broad sense as indicated more fully hereafter, has generally been accomplished heretofore either by the balancing of forces acting upon unequal areas or by the balancing of forces through levers of unequal length. The present invention relates to a third method having special advantages and involving what may be generally called the use of ratios of fluid resistances. If fluid is passed through two resistances in series between an initial pressure and a final pressure and negligible flow is taken from the junction of the resistances there will appear pressure drops across the resistances which are related to the overall pressure drop as functions of the resistance values. Even if flow takes place from the junction there will be functional relationships involved which may be utilized for the purpose of indication or control.

Of major importance is the securing of amplification in the conventional sense, i. e., of securing an output pressure which bears a constant ratio to some pressure subject to control. One of the objects of the present invention is the provision of such amplification. More broadly the objects relate to results securable through the same general principles in the way of amplification of forces or displacements to produce pressures, forces or displacements in excess of those applied or capable of giving rise to useful power, for example, for control or signaling purposes. The magnification or amplification need not be greater than unity but may be less as, for example, where a very high pressure or quite large force give rise to a low pressure or smaller force suitable for indicating or control purposes. As an instance of this may be cited gauges or the like for indication of very high pressures or very large forces. If such gauges are made to withstand the large pressures or forces they may be required to be quite elaborately constructed and, consequently, will be expensive. In accordance with the present invention simple, inexpensive means may be provided to reduce pressures or provide very small displacements under the application of very large forces to make possible the use of inexpensive gauges designed for low pressure. A further object of the invention is the provision of an improved fluid relay which is of quite general applicability being in the form of a standard unit which, by minor internal changes or by variations of external connections, may be applied to a great many uses.

These and other objects of the invention relating to particular applications thereof or to various details of applications will be apparent from the following description read in conjunction with the accompanying drawings in which.

The relay, which by the adoption of suitable external connections may be utilized in various systems as described hereafter is detailed in Figures 1 to 5 inclusive. It comprises three major casing parts indicated at 2, 4 and 6, of which 4 and 6 are duplicates. Screws 9 connect the parts 4 and 6 to the base part 2 and the parts 4 and 6 are held assembled to 9 and substantially closed against influx of dirt from the outside by a clip 7 having a U-shaped cross section.

Figure 1:
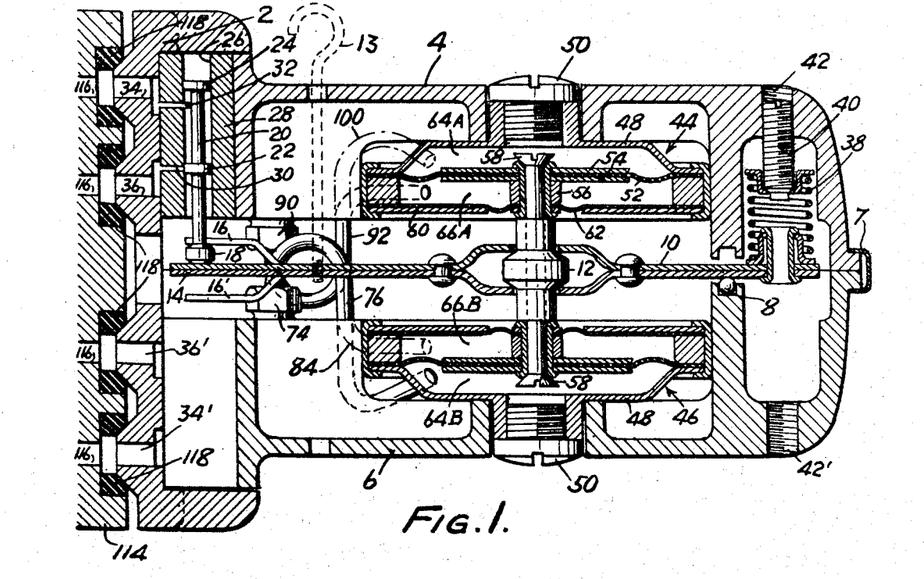
Figure 1 is a vertical section taken through an improved relay of general application to the present invention.

Within the housing thus formed a fulcrum is provided, by a pair of balls 8 set into suitable sockets, for a lever 10 which may be most simply formed by a pair of metallic strips riveted together as indicated. The central portion of this lever embraces a member 12 through which motions are imparted thereto as later described. A hook 13 projecting through a hole in either the top or bottom of the housing makes possible mechanical connection with the lever.

The left hand end of the lever, as illustrated in Figure 1, extends at 14 and is provided with diverted prongs 16 and 16' to engage the enlarged end 18 of valve stem 20 which is provided with pistons 22 and 24 slidable in a bore 26 of a cylinder 28. Saw slits 30 and 32 are cut into the cylinder wall and intersect the bore 26 to provide ports as indicated. The casing portion 2 is provided with openings 34 and 36 communicating with the ports. As will be evident from Figure 1 the cylinder 28 could be located in the lower portion of the housing rather than the upper portion, and for this purpose the valve stem 20 would be engaged by the prongs 16' and communication would be afforded with the ports through the openings 34' and 36'.

To apply an adjustable force to the right hand end of the lever 10 there is provided a spring 38 adapted to be adjustably compressed through adjustment of a screw 40 threaded into a bore 42 in the housing. A similar bore 42' may be used if force of the spring is required to act upwardly rather than downwardly. It will thus be evident that with various arrangements of the spring and the valve and its associated parts, different combinations of the elements are made possible utilizing the same standard construction of the relay.

As illustrated in Figure 1 there are located respectively above and below the lever 10 chamber assemblies indicated at 44 and 46, which are identical in construction and consequently only one need be described. The chamber assembly comprises a rigid end 48 closed by a screw 50 for most conditions of operation, the screw being provided to afford, if desired, an opening through which there can be a mechanical take-off from the lever 10. The opening normally closed by the screw also affords provision for assembly of the parts.

Within the chamber assembly there is located a slack diaphragm 52, the periphery of which is secured to the periphery of the wall 48 as indicated. The central part of this diaphragm is clamped between plates 54 and secured to a central assembly indicated at 56 which, in turn, is secured to the member 12 by a screw 58. Another slack diaphragm 62 is peripherally secured to the rigid end 48 and is backed up by a rigid plate 60 having an enlarged central opening so that only the central portion of the diaphragm 62 is capable of flexure. The resulting arrangement, as applied to the upper chamber assembly, provides an upper chamber 63-A having one rigid wall at 48 and a flexible wall constituted by the entire area of the diaphragm 52 within the regions of clamping of the diaphragm at its periphery. In other words, the area acted upon by a fluid in the chamber 64-A is the entire area of the diaphragm including that covered by the upper plate 54 exposed to the fluid.

The assembly also provides a lower chamber 66-A, the upper side of which is closed by the diaphragm 52 while the lower side is closed by the diaphragm 62. While the entire area of the diaphragm 52 including the lower plate 54 is effectively exposed under pressure to chamber 66-A, the only effective part of the diaphragm 62 is the limited area within the bounds of the opening in the rigid plate 60. Thus the pressure in the chamber 66-A effectively acts upwardly upon an area which is the difference between areas of the diaphragm 52 and of the central portion of the diaphragm 62.

Similar chambers 64-B and 66-B are provided in the lower chamber assembly. Connections to the various chambers just described are afforded through openings in the member 2 of the housing as follows:

An opening 70 in the member 2 communicates through a lateral extension with an opening 72 in the lower member 6 which, in turn, communicates with a fitting 74 between which and the chamber 64-B is a tube 76 which may be soldered or otherwise secured to the lower chamber assembly. A second opening 78 in the member 2 communicates through a lateral extension with an opening 80 in the lower member 64 which, in turn, communicates with the chamber 66-B through a fitting 82 and a tube 84.

A third opening 86 in member 2 communicates through a lateral extension with the opening 88 in the upper member 4 which likewise through a fitting 90 and a tube 92 communicates with the chamber 66-A. A fourth opening 94 in the member 2 communicates with an opening 96 in the upper member 4 and thence through the fitting 98 and tube 100 with the chamber 64-A. It will be seen from the above and from the drawings that there are thus provided, symmetrically so far as members 4 and 6 are concerned, external connections to the various chambers. The various tubes are offset to avoid interference with each other and readily made connections are afforded through the fittings as described. The chamber assemblies are held in their respective members of the housing by suitable screws 45 and washers.

Figure 2:
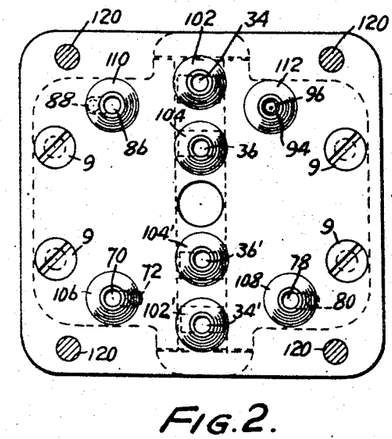
Figure 2 is an elevation of the base of the improved relay.
Figure 3:
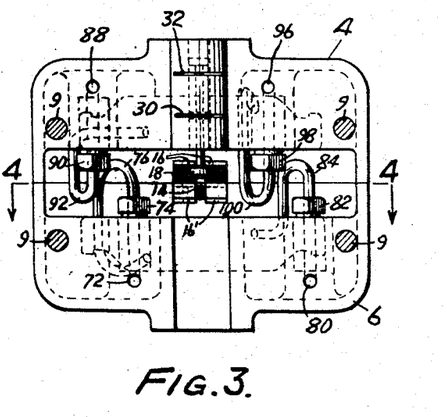
Figure 3 is a section through the improved relay taken inside the base thereof.
Figure 4:
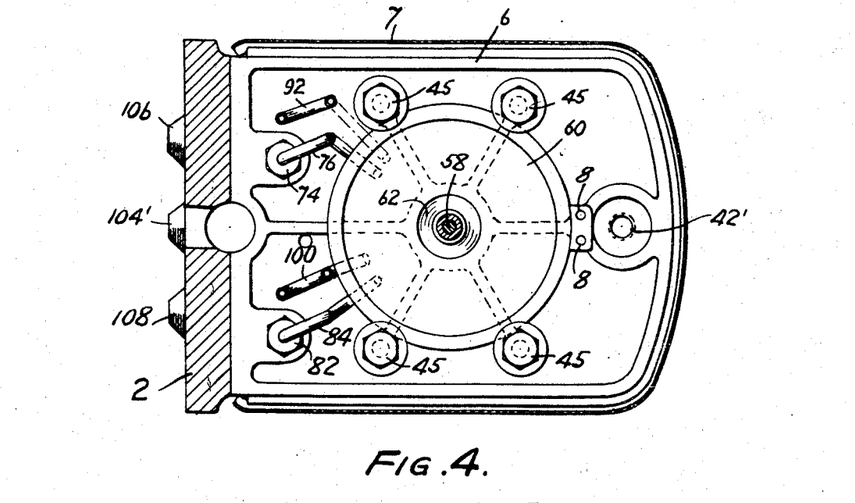
Figure 4 is a section taken on the plane, the trace of which is indicated at 4—4 in Figure 3.
Figure 5:
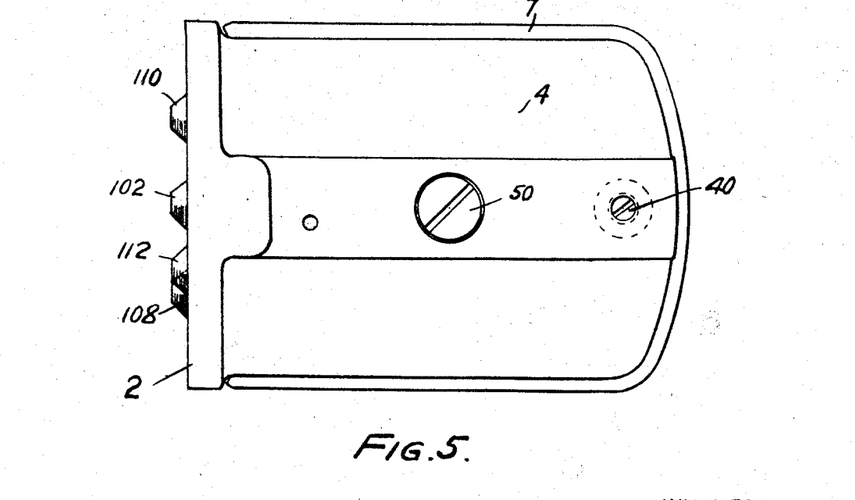
Figure 5 is a plan view of the relay.

As indicated particularly in Figure 2 there is thus presented an arrangement of openings in the face of the member 2 through which all of the fluid connections can be made. Each of the openings is surrounded by a conical projection, there being one for each of the openings. The openings 34, 36, 34' and 36' are surrounded by the cones 102, 104, 102' and 104' arranged in line centrally of the member 2. Openings 70, 78, 86 and 94 are respectively surrounded by the cones 106, 108, 110 and 112. In the case of these latter, however an asymmetrical arrangement is provided which may take various forms but may simply involve, as illustrated, the location of the cone 12 closer to the center line of the housing than the other cones of this group.

To provide the necessary external fluid connections there is used a plate, such as indicated at 114, provided with openings 116 which are enlarged on one face of the plate to receive gaskets 118. These gaskets receive the various cones as illustrated in Figure 1, the member 2 being clamped tightly to the plate 114, to provide fluid tight joints in the cones, by screws 120 passing through the member 2 and threaded into tapped holes in the plate 114.

By reason of the asymmetry of the cones it will be evident that the relay can be associated with the plate 114 in only one position. An equivalent result may be secured by providing other asymmetrically located interengaging elements. The arrangement is thus somewhat analogous to that commonly provided in the case of vacuum tubes in conjunction with their sockets in which asymmetric arrangements of their prongs make it impossible to secure a tube in an incorrect position. Carrying out the analogy the relay forms essentially a unit while the plate 114 which may, in the case of the use of a number of relays, be provided with a plurality of sets of openings, forms a chassis to the openings in which tubes may be connected in various arrangements in much the same fashion as wires are connected to the sockets of a vacuum tube apparatus.

It will be evident from the foregoing that standard relay parts may first be assembled in various relationships to give rise to a number of different relays in which gravity may act with or against an adjusting spring and in which force acting with gravity may result in either inward or outward movement of a valve member. Any such relay, which presents the same external appearance as any other so far as its external openings are concerned, may then be assembled to a plate such as 114 to which a wide variety of external connections may be made. In short, the approved relay arrangement just described may be made up in standard forms and is then readily adapted to a large number of uses by the making of suitable connections as will be apparent hereafter.

While the relay which has been described above is capable of many other uses, one of its greatest advantages lies in its use in a type of system hereafter described and forming a major object of the present invention. The system may be described generally, for convenience, as an amplifying system since, generally speaking, its function is to provide an output pressure which is either in excess of some input controlling pressure or represents the ability to exert a force or provide substantial energy in response to a relatively small displacement, force or the like. However, as will be evident from the following, the principles involved are not necessarily associated with amplification in such conventional sense but rather with translation of some condition subject to variation into a usable pressure capable of providing either an indication or of exerting or providing some useful action. In fact, as will be brought out there may be involved merely pressure regulation. For convenience, however, amplification will generally be referred to with the understanding that that term is here used in the broad sense just indicated.

Figure 6:
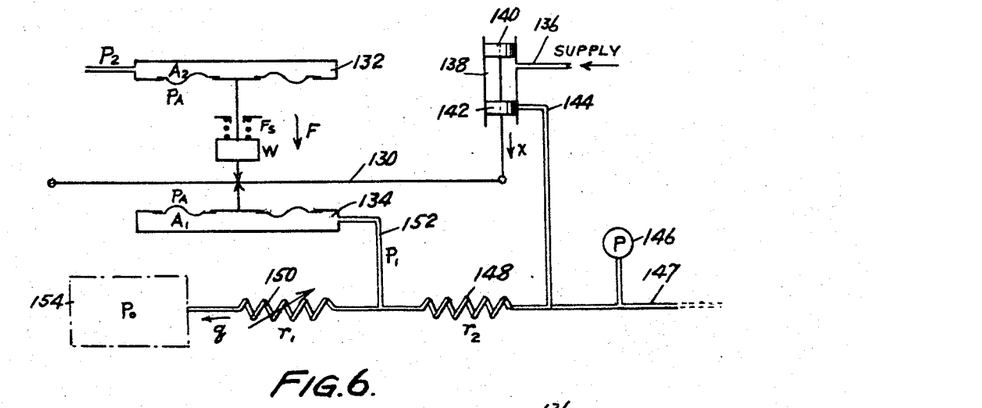
Figure 6 is a diagram showing the principles of amplification involved in the present invention.

The principles of the system of the present invention will be clear from consideration of Figure 6 in which there is illustrated diagrammatically a system in which will be recognized the relay heretofore described conventionalized as to showing and generalized by indication of a force F made up of a weight W, a spring force $F_3$ and a pressure force $P_2A_2$. The area, $A_2$, of the diaphragm of the upper chamber is, for generalization, indicated as different from that, $A_1$, of the diaphragm of the lower chamber. Capital P's will be used hereafter to indicate absolute pressures while small $p$'s will be used to indicate gauge pressures relative to the atmospheric pressure $P_A$.

In Figure 6 an upper chamber is indicated at 132 capable of exerting on a lever 130 of a relay a force which is made up as stated in the preceding paragraph. The weight W may be no more than the weight of the lever and the valve member. It may, however, represent an additional weight applied to the lever through a suitable connection. The lever 130 is connected to a valve arrangement comprising the two pistons 140 and 142. A supply pressure is introduced at 136 into the space at 138 between the pistons. A connection 144 adapted to be covered by the piston 142 and opened, alternatively, either to communicate with the chamber 138 or with the atmosphere is connected to a gauge 146 and/or a line 147 if the pressure therein is to be applied to the operation of some control element. The connection 144 also leads to a resistance 148 in series with a resistance 150, either or both of which resistances may be variable. Between the resistances 148 and 150, a connection 152 leads to a lower chamber 134, the diaphragm of which is also arranged to act upon the lever 130. For the sake of generality, the far end of the resistance 150 is shown as communicating with a region 154 which may be the atmosphere or some other region as hereafter described.

It will be evident that the above array of elements may be provided by the choice of suitable parts of the relay described heretofore with proper external connections. The resistances $r_1$ and $r_2$ may take various forms such as capillary tubes, members containing porous material of ceramic or other type, or particularly in the case of adjustable resistances, a needle valve capable of fine adjustment permitting setting of the resistance value. Other alternative forms of these resistances will be mentioned hereafter.

Assuming the volume of the lower chamber 134 small, the flow $q$ of fluid is the same through $r_1$ and $r_2$. The pressure at the outlet of $r_1$ is generalized as $P_0$. $P_1$ is the pressure between $r_1$ and $r_2$ existing in the lower chamber. P is the pressure at the inlet to $r_2$ from the valve.

Then:

(1) $$P - P_0 = q(r_1 + r_2)$$

(2) $$P_1 - P_0 = qr_1$$

(3) $$A_1(P_1 - P_A) = F$$

From the above:

(4) $$P = P_0 + \frac{(r_1 + r_2)}{r_1} \cdot (P_1 - P_0)$$

Writing $$\frac{r_1+r_2}{r_1}=\mu$$

which for reasons hereafter evident will be called the "amplification factor":

(5) $\qquad P = P_0 + \mu\dfrac{F}{A_1} + P_A - P_0$

The spring force Fs is equal to $F_0-K_s x$ when $x$ is a displacement taken positive in the direction indicated, Ks is the spring constant and $F_0$ is the value of Fs at $x=0$. Equation 5 then becomes, in general:

(6)
$$P = P_0 + \mu(P_A - P_0) + \mu\frac{(W+F_0-K_s x)}{A_1} + \frac{\mu A_2}{A_1}(P_2 - P_A)$$

It will be evident that except for the term $K_s x$, P given by (6) is independent of the displacement of the valve. Ideally, the valve should have zero movement to open the port at the lower piston either to atmosphere or to the supply. Actually, to maintain a pressure P it must move and the displacement $x$ will be a function of the supply pressure, the pressure P, and the demand for fluid through the valve both to provide flow at $q$ and through the connection to any mechanism operated by the variations in pressure P. With a well designed valve, however, the range of $x$ will be small and the law of its variation is relatively immaterial if $$\frac{\mu K_s x}{A_1}$$

is negligibly small or approximately linear with P as will normally be the case throughout any useful working range. In fact if $x$ has a limited range, the maximum value of $$\frac{\mu K_s x}{A_1}$$

will be ascertainable whence the extent to which the displacement affects the results will be obvious. It may be noted that this last expression is also reduced in its effects if Ks is small and A₁ large. In the following it will be assumed that a sufficient approach to the ideal relay exists so that this term is negligible, in which case the following general equation may be assumed to hold:

(7)
$$P = P_0 + \mu(P_A - P_0) + \frac{\mu}{A_1}[W + F_0 + A_2(P_2 - P_A)]$$

Returning to Equation 5, for many purposes P₀ will be atmospheric pressure $P_A$, and substituting gauge pressure $p$ for $P-P_A$:

(8) $\qquad p = \dfrac{\mu F}{A_1}$

If $\mu$ is a constant (i. e. $r_1$ and $r_2$ are constants) $p$ is proportional to F. If F is constant (i. e. W, $F_0$ and $P_2$ individually or in combinations are constants) it will be seen that $p$ is maintained constant so that the system will act as a pressure regulator in which W, $F_0$ or $P_2$ may be set to constant values. The advantage of this arrangement over conventional pressure regulators or reducers is that the pressure sensitive element, the diaphragm of chamber 134, need not be made strong enough to withstand the full pressure which is being regulated.

Conversely, $p$ serves as a measure of F no matter how F is produced and may indicate weight as in an application of the system to weighing, or motion if compression or tension is applied to a spring by displacement, remembering that the lever position is essentially constant for a well designed valve.

One of the most important applications of this arrangement is in its response to a pressure $P_2$ applied to the diaphragm $A_2$. Then:

(9) $\qquad P = P_0 + \mu\left[\dfrac{A_2(P_2-P_A)}{A_1} + P_A - P_0\right]$

If $A_1=A_2$ (as in the use of a simple relay element as above described):

(10) $\qquad P - P_0 = \mu(P_2 - P_0)$ or:

(10') $\qquad p = \mu p_2$ whence the adoption of the term "amplification factor" will be evident as applied to relative or gauge pressures.

It is readily possible to obtain an amplification factor of 500 or more from which it will be seen that the system is applicable to many uses where a small pressure differential exists. Specific uses will be referred to hereafter.

Returning to the general Equation 5, or to the special Equations 6 to 10, it will be evident that $\mu$ may be variable so that P (or $p$) may be made responsive to $\mu$ if the other quantities are constant. Usually, if $\mu$ is to be made variable this will be due to variability of $r_1$, the low resistance, rather than $r_2$, the high resistance. The variable resistance $r_1$ may take many forms: it might be provided by a capillary tube the resistance offered by which is dependent upon temperature so that P may measure temperature; it might be provided by a baffle, minute movements of which may serve to provide large variations in resistance at an orifice substantially closed by the baffle, in which case P measures a displacement on some quantity on which the displacement depends; it might be provided by a measured quantity of powder through which flow takes place so that P may serve to provide a measure of particle size distribution; or, as a further example, the variable resistance may depend upon the position of a ball or rod or the like within a tapered tube and subject to location by a float or other variable element, as in the case of the flowmeter set forth in the application of William Melas and myself, Serial Number 553,700, filed September 12, 1944, now Patent No. 2,475,630 of July 12, 1949.

Considering Equation 5, if F and $\mu$ are constant (and with F possibly negative) it will be evident that a pressure P₀ may be measured. P₀ may be the pressure in an evacuated chamber, provided the flow of air or gas thereinto is negligible and harmless, as, for example, in the case of measurement of the pressure in a condenser or vacuum still, or the like. P₀ may, of course, be above atmospheric pressure. It may be here noted that "atmospheric" pressure is a relative term since the exterior of chamber $A_1$ may well be subjected to an artificial "atmosphere" of any desired pressure. The equivalent result follows if chamber $A_2$ is maintained at some constant absolute pressure.

Specifically an absolute pressure gauge may be provided capable of measuring P₀, if 132 is evacuated so that $P_2=0$, $A_1=A_2$ and F and/or W is maintained constant. Then:

(11) $\quad P = P_0(1-\mu) + \dfrac{\mu}{A_1}(W+F_0)$ (It is to be noted in this last case that if a spring is used an error is introduced to the extent that F varies due to displacement of the valve member as described above.)

If $P_0$ is atmospheric pressure, it will be obvious that such an arrangement will function as a barometer or altimeter.

A major advantage of the present invention lies in the possibility of staging amplification to secure quite large degrees of amplification with a high degree of stability. The accomplishment of staging will be clear from Fig. 7 which diagrammatically illustrates the system of Fig. 6 forming a first stage with the addition of a second stage.

Figure 7:
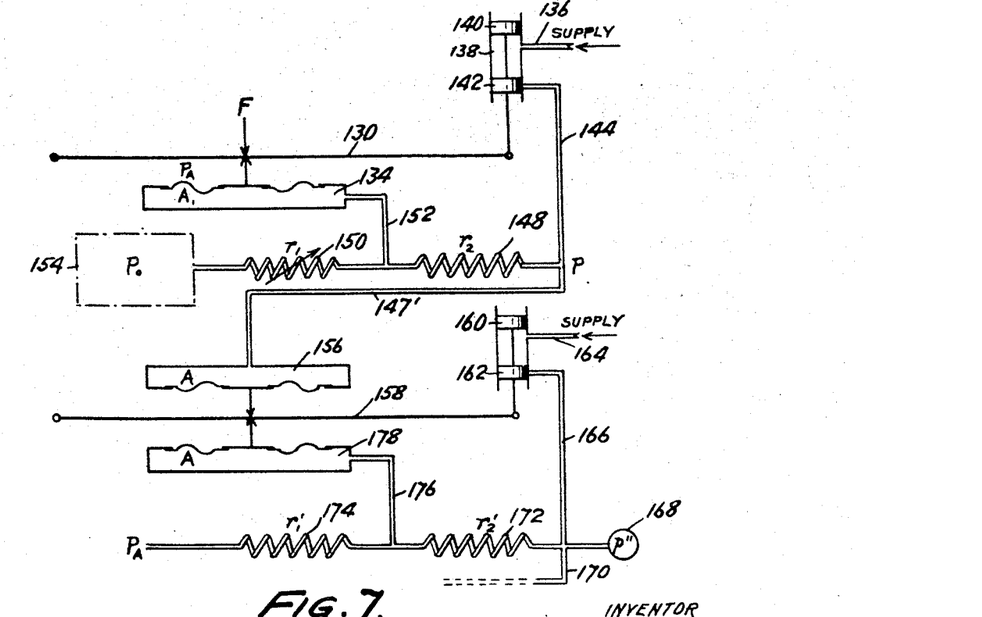
Figure 7 is a diagram showing multiple stage amplification.

In Figure 7 the parts which are identical with those of Figure 6 are similarly designated by reference characters. The connection 147' corresponding to the connection 147 in this instance leads to a chamber 156, the diaphragm of which exerts a force upon a lever 158 controlling a valve comprising the pistons 160 and 162 into the region between which there is led supply fluid at 164. A connection 166 controlled by the piston 162 communicates with a pressure gauge 168 and/or a line 170 through which a resulting pressure may be applied to useful purposes. Resistances 172 and 174 arranged in series between the connection 166 and an outlet which, for simplicity, may be considered the atmosphere. Between them a connection 176 extends to a lower 178, the diaphragm of which acts upwardly upon the lever 158. It will be evident that the newly added elements may be provided by a second relay of the type previously described and suitable external connections.

It will be seen that the output pressure of the first stage provides the input pressure of the second stage. While the second stage, like the first, may be unsymmetrical in the areas of the chamber diaphragms, may be unbalanced as to weights of the parts, and may involve flow to a pressure such as $P_0$ other than atmospheric, there is illustrated for simplicity a balanced arrangement in which $A_1=A_2=A$ and flow occurs to atmospheric pressure $P_A$. Then:

(12) $\quad P'' - P_A = \mu_2(P-P_0) = \mu_1\mu_2\left(\dfrac{F}{A_1}+P_A-P_0\right)$ in which $\mu_1$ and $\mu_2$ are the respective amplification factors of the first and second stages.

In general, for $n$ stages, (13) $\quad p^{(n)} = \mu_1\mu_2 \ldots \mu_n\left(\dfrac{F}{A_1}+P_A-P_0\right)$ if the additional amplification stages are similar to the second just described. Somewhat similar expressions of more complicated nature will obviously apply when conditions are not so simple.

Figure 8:
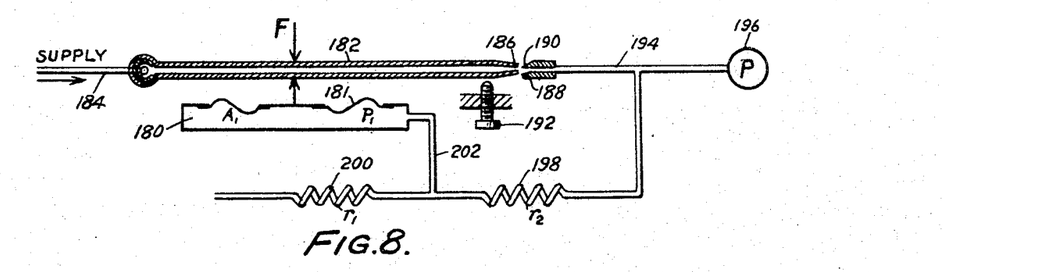
Figure 8 is a diagram showing the application of a movable fluid nozzle as a substitute for a pilot valve.

In the modifications so far described, a slide valve has been illustrated to secure a controlled pressure under the action of diaphragms. It will be clear that the valve illustrated may be replaced by numerous types of valves well known to the art capable of effecting similar control. However, in place of a valve there may be used a quite different arrangement particularly in instances where the operating fluid is a liquid rather than a gas. Figure 8 illustrates this modification of the invention. A chamber 180 having a diaphragm 181 acts upon a lever 182 in opposition to a force F. The lever in this case is hollow and arranged to receive through its pivot from a high pressure supply line 184 a fluid which it discharges through a nozzle 186 into an impact tube, the entrance opening of which is indicated at 188 being bounded on one side by a sharp edge 190 capable of splitting the jet which is directed toward the tube so that more or less of the jet will enter the tube depending upon the position of the lever 182, and the consequent misalignment of the nozzle with the impact tube. An adjustable stop screw 192 limits movement of the tube in one direction as illustrated, i. e., it limits the movement of the nozzle beyond a point at which the entire jet is received by the impact tube. A connection 194 from the impact tube leads to resistances 198 and 200 in series. The connection between these resistances is joined through tube 202 to the chamber 180. A gauge 196 connected to 194 will indicate a pressure related to the force F in the identical fashion heretofore discussed. If it is desired to utilize the pressure for control purpose a suitable connection is made at the location of the gauge as in the case of the previous modifications.

Figure 9:
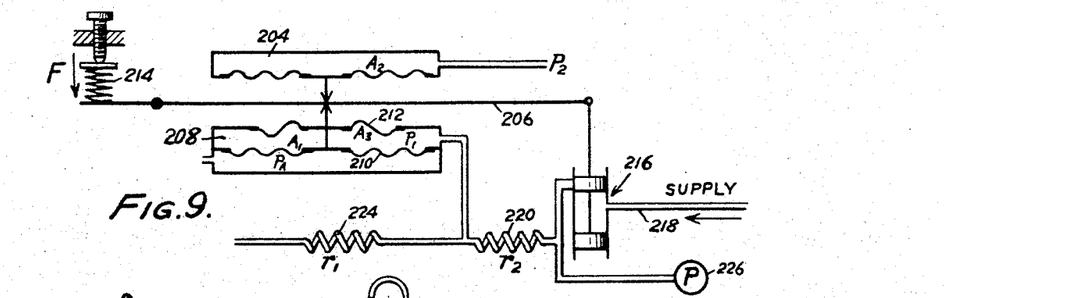
Figure 9 is a diagram showing an arrangement in accordance with the invention in which a decrease of useful pressure is provided by an increase in input pressure.

In the case of the arrangements heretofore discussed an output pressure is produced which increases upon the application of a force. It is sometimes desirable to have the reverse action occur and a suitable arrangement for this purpose is illustrated in Figure 9. In this figure, by way of example, a force is applied by a pressure $P_2$ acting upon the diaphragm, having an area $A_2$, of a chamber 204. The diaphragm is connected to a lever 206 which is subject to an adjustable fixed force exerted by a spring 214. A chamber 208 on the opposite side of the lever 206 is provided with two diaphragms, 210 and 212, both connected to the lever and having respective areas $A_1$ and $A_3$ of which the former is the larger. The lower side of the diaphragm 210 is open to the atmosphere as indicated.

The lever 206 controls a valve 216 of the same type as that previously described which is supplied with fluid under pressure, from a line 218 and delivers, in the fashion previously described, fluid through the series arrangement of resistances 220 and 224, the connection between which communicates with the chamber 208. The gauge 226 represents the point of delivery of a controlled pressure.

An analysis of Figure 9 similar to that heretofore given will reveal that the gauge pressure appearing at 226 is related to the gauge pressure in the chamber 204 as follows:

(14) $\quad P - P_A = \dfrac{\mu F}{A_1-A_3} - (P_2-P_A)\dfrac{\mu A_2}{A_1-A_3}$ From this:

(15) $\quad \dfrac{dp}{dp_2} = -\dfrac{\mu A_2}{A_1-A_3}$

The arrangement of Figure 9 lends itself without change to operation from a vacuum "supply" drawing air from the atmosphere into the left-hand end of resistance $r_1$ and in opposition to the arrow in Figure 9 through connection 218. Such operation is of particular value, for example, in automotive uses where the intake manifold vacuum may be used for operation, or in the case of laboratory work where suction may be simply provided by a water aspirator. The characteristics are given by Equation 14 which still holds with the exception that $P-P_A$ will now be negative, i. e., P will now be less than $P_A$ and gauge 226 will be a vacuum gauge or the output will now produce a suction. For such operation, of course, if $P_2-P_A$ is positive, the first term on the right of Equation 14 must be less in magnitude than the second term. If $P_2$ is less than $P_A$, operation merely requires $A_3$ to exceed $A_1$ by obvious reversal of the diaphragm arrangement. It may be noted that such vacuum operation is also possible with obvious changes of the various other arrangements herein described.

Figure 10:
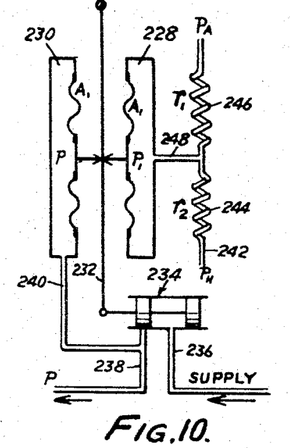
Figure 10 is a diagram showing the application of the invention to a constant-ratio pressure reducer.

A useful but simple application of the invention lies in the provision of a constant-ratio pressure reducer in which no high pressure is applied to the regulator mechanism and hence it need not be constructed to withstand high pressure. Figure 10 illustrates a reducer of this type. Heretofore, the weight of the operating parts has been considered either negligible in view of the much larger forces which are exerted in the system or has been utilized as part of a necessary weight or other force involved in the system. In certain cases, however, the weight of the parts even though quite small might exert some undesirable effects on the system. These effects may be minimized by mounting the relay apparatus in such fashion that the lever is suspended vertically so that its weight and the weight of its associated parts will not exert any appreciable force upon the diaphragms. Such an arrangement is indicated in Figure 10. Two opposed chambers 228 and 230 have their diaphragms arranged to act upon the lever 232 which controls a valve 234 of the type heretofore described, arranged to receive fluid from the supply line 236 and deliver controlled pressure to the line 238. The line 238 is connected through the tube 240 to the chamber 230.

A high pressure $P_H$ is applied at 242 from a source which may be or may not be the same as the supply to the line 236. The line 242 is vented to the atmosphere through the series arrangement of resistances 244 and 246, the junction of which is joined at 248 with the chamber 228. Analysis of the system will show that fluid will be delivered at a gauge pressure bearing a constant ration to the pressure in the line 242 in accordance with the following:

(16) $\quad P-P_A=\dfrac{r_1}{r_1+r_2}(P_H-P_A)$

Figure 11:
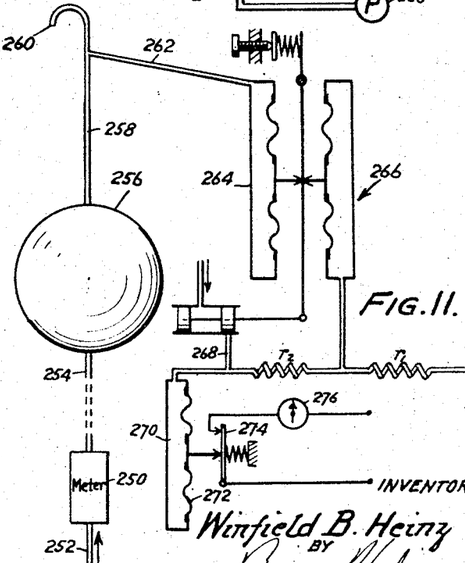
Figure 11 is a diagram showing the application of the invention to the detection of quite small pressure changes as provided, for example, by a slight change of a liquid head.

The application of the invention to the detection of small pressures is well illustrated in Figure 11 in its use in conjunction with apparatus for the calibration of flowmeters. Flowmeters are conventionally calibrated by causing the flow therethrough to enter a large calibrated volume, note being taken of the passage of the liquid level past marked points below and above the volume. The relay of the present invention is capable of responding not only to very small pressures but with a very small displacement of diaphragm. In Figure 11 the arrangement is such that a very slight rise of liquid above a fixed mark will serve to interrupt the operation of a timer.

A meter 250 receives flow from a line 252 and the liquid therefrom passes through a tube 254 to the calibrated volume 256 whence it passes through an upright tube 258 of small bore vented at 260. At a particular level in the tube 258 there communicates with it a tube 262 which slopes downwardly to a chamber 264, the chamber and the tube being filled with liquid. The diaphragm of chamber 264 acts upon the lever of a relay 266 of the type illustrated in Figure 6, arranged to deliver an amplified pressure through connection 268 to a chamber 270 provided with a diaphragm 272 which is arranged when moved to the right by pressure to open a switch 274 breaking the circuit of an electrical timer 276 which may take the form of a conventional electric clock. As a result of this arrangement a very slight rise of the liquid in the tube 258 above the point of communication with the line 262 will produce interruption of the timing circuit so that the time required for filling the volume 256 may be accurately and automatically ascertained, the circuit being closed manually or automatically as the liquid reaches some lower mark.

Figure 12:
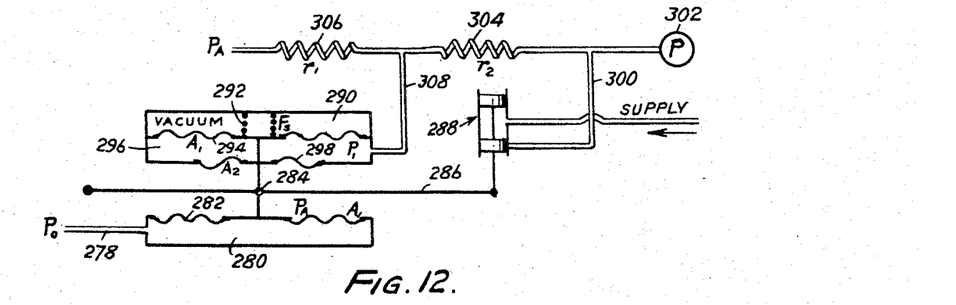
Figure 12 is a diagram illustrating the application of the invention to the provision of a gauge for measurement of subatmospheric absolute pressures.

The principles of the invention may be further illustrated by a gauge illustrated in Figure 12 for measurement of sub-atmospheric absolute pressures. The pressure to be measured is applied at 278 to a chamber 280 having a diaphragm 282 with an area $A_1$ connected at 284 to a lever 286 of a relay of the type previously described, which lever 286 controls a valve 288. A chamber 290 on the opposite side of the lever is provided with a diaphragm 294 also of area $A_1$, which diaphragm is acted upon by a spring 292 supplying a force $F_S$. Below the diaphragm 294 is a chamber 296 closed at its lower side by a diaphragm 298 of a smaller area $A_2$. Diaphragms 294 and 298 are both connected to the lever 286. Air controlled by the valve 288 flows through connection 300 to a gauge 302 and is vented through the series arrangement of resistances 304 and 306, the junction of which communicates through 308 with chamber 296. If chamber 290 is evacuated gauge pressure at 302 will be related to the absolute pressure at 278 as follows:

(17) $\quad P-P_A=\dfrac{r_1+r_2}{r_1}\left\{\dfrac{F_S}{A_1-A_2}-P_0\cdot\dfrac{A_1}{A_1-A_2}\right\}$ In this modification it may be noted that the diaphragm 294 could structurally embody the spring 292 by being made in a semi-rigid form capable of mechanically opposing motion. At this point it may be noted that all of the diaphragms heretofore described have been of the so-called "slack" type offering negligible resistance to their own motion, i. e., being without substantial stiffness. Such diaphragms are generally provided by thin plastic sheets which are gastight but which are so arranged as to be under no substantial restraint to their movements. Such diaphragms will be understood as provided herein unless otherwise noted. Where, however, as in the present case, a force is exerted directly on the diaphragm it will be understood that such a slack diaphragm may be replaced by one having the proper amount of stiffness.

Heretofore, it has been assumed that the volumes of the various diaphragm chambers are small and that steady state conditions prevail and have alone been of interest. In certain applications of the invention use may be made of transient conditions to achieve certain desired ends.

Figures 13, 14, 15:
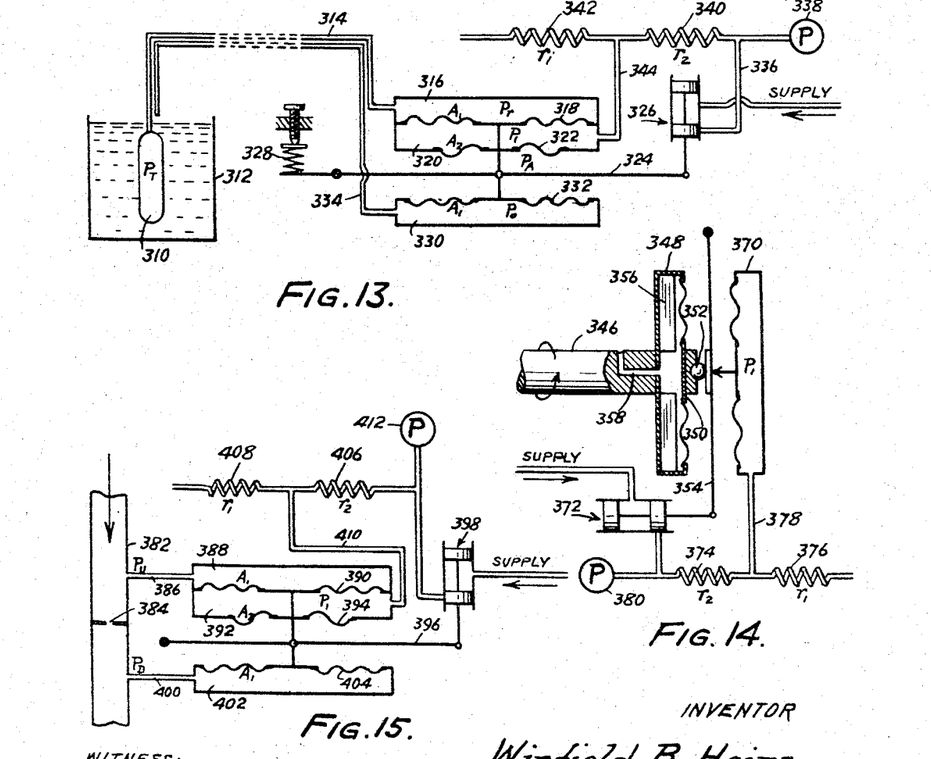
Figure 13 is a diagram illustrating the application of the invention to temperature measurement.
Figure 14 is a diagram, partly in section through certain mechanical parts showing a high speed tachometer embodying the invention.
Figure 15 is a diagram showing the application of the invention to flow measurement.

An example of this is illustrated in Figure 13 in which the invention is applied to temperature measurement. The necessity for transferring heat into any temperature responsive element to cause it to indicate temperature causes the indicated temperature to lag behind the actual temperature. It has, consequently, been proposed to provide temperature indicating systems with means for compensating for this lag so that better approximations to instantaneous temperature conditions will be secured.

In Figure 13 a bulb 310 filled with air or suitable gas at atmospheric or other pressure is illustrated in a medium 312, the temperature of which is to be indicated. A capillary tube 314 connects the bulb to a chamber 316 closed by the diaphragm 318 having an area $A_1$. Below chamber 316 is another chamber 320 which has its lower side closed by a diaphragm 322 having an area $A_2$ less than $A_1$. The two diaphragms are connected together and to a lever 324 controlling the valve 326 as in previously described constructions. A spring 328 subject to adjustment is provided to adjust the system.

A lower compensating chamber is provided at 330, closed by a diaphragm 332 having an area $A_1$. To provide complete compensation including that of conditions which may arise due to temperature or volume changes in the capillary 314 there extends from the chamber 330 a tube similar to 314 and running with it to a point adjacent to the bulb 310, the tube 334 being closed at its end. The pressure in chamber 330 is initially adjusted to secure the proper operating characteristics of the system.

The output fluid from the valve 326 passes through the connection 336 from which bleeding may occur to the atmosphere through resistances 340 and 342 in series. The junction of these resistances is connected through 344 to the chamber 320. A suitable pressure gauge 338 indicates the pressure existing in 336.

The steady state response of pressure at 338 to the pressure existing in the bulb 310 is given by the following equations:

(18)
$$P - P_A = \left(\frac{r_1 + r_2}{r_1}\right)\left(\frac{A_1}{A_1 - A_2}\right)(P_T - P_0) + \text{constant}$$

The result, it will be noted, is independent of atmospheric pressure. The variation of pressure in the bulb with temperature is in accord with the gas laws and need not be here discussed.

The transient condition which is of interest may be understood by considering an initial downward movement of diaphragm 318. This will create an instantaneous incremental opening of the pilot valve and consequently an instantaneous increase in the pressure P. An increase of flow through resistance 340 occurs to produce a gradual accumulation of additional fluid in chamber 320 until the pilot valve is returned toward its neutral position. As a consequence, the pressure $P_1$ in chamber 320 will lag the pressure P by an amount which is the function of the product of the resistance 340 and the fluid capacitance involved in the chamber 320 and its connections. By correctly adjusting the values of this resistance and capacitance, the amount by which the pressure P leads the pressure $P_1$ can be fixed at any desired value. Obviously, this means that it also leads the pressure $P_T$. If this time lead is made equal and opposite to the lag between $P_T$ and the pressure which should exist at the temperature surrounding the bulb, the indicated pressure P can be kept substantially in phase with the temperature which should be indicated.

A further application of the invention illustrative of a special use is embodied in Figure 14 which shows a tachometer particularly adapted for measurement of very high speeds. This comprises a shaft 346 adapted to be driven at the high speed to be measured and which carries a chamber 348, a radial wall of which is provided with a flexible diaphragm 350. The diaphragm 350 is provided with a central ball 352 bearing upon a lever 354. Vanes 356 are provided in the chamber 348 so that during its rotation the air therein will be rotated at the same speed without lag. The central portion of the chamber 348 is vented to the atmosphere through an opening in the shaft at 358. The remaining construction is simply an amplifying relay of the type previously described comprising a chamber 370, the diaphragm of which acts upon the lever 354 in opposition to the force exerted on the lever by the diaphragm 350. The pilot valve 372 controls flow of air or other fluid to the series arrangement of resistances 374 and 376, the junction between which is connected at 378 to chamber 370. A suitable gauge 380 may be calibrated in terms of speed of the shaft 346. It may be noted that for lower speeds of rotation the rotating chamber may be filled with liquid to secure higher pressures. The simplicity of the arrangement for very high speeds when air is used as the fluid will be obvious.

The application of the invention to the measurement of flow is illustrated in Figure 15. In this case, measurement is made of the differential pressure existing across an orifice 384 in a passage 382 in which flow is taking place. A connection 386 from the upstream side of the orifice communicates with a chamber 388 closed by a diaphragm 390 having an area $A_1$. Below this is a chamber 392 which has its lower side closed by a diaphragm 394 having an area $A_2$. The two diaphragms are connected together to act upon a lever 396 controlling the valve 398. A connection 400 from the downstream side of the orifice leads to a chamber 402, the diaphragm 404 of which acts upon the lever 396 as indicated. The valve 398 delivers fluid through the series resistances 406 and 408 connected at their junction to the chamber 392 by tube 410. A pressure gauge 412 will indicate a pressure proportional to the pressure drop across the orifice in accordance with the following equation:

(19) $P - P_A = \left(\frac{r_1 + r_2}{r_1}\right)\left(\frac{A_1}{A_1 - A_2}\right)(P_U - P_D)$ The arrangement of Figure 15 has the objection that the diaphragms 390 and 404 are subject to the line pressure and, therefore, have an unavoidable inherent stiffness. Consequently, it is essential that only a very small movement should be required to move the relay pilot valve through its full stroke. It is also quite necessary that there be very little friction particularly if the pressure differential is small. In order to avoid the few thousandths inch stroke which is required by the ordinary pilot valve and to avoid friction in a pilot valve there is desirably provided for flow measurement the more elaborate system of Figure 16.

Figures 16, 17:
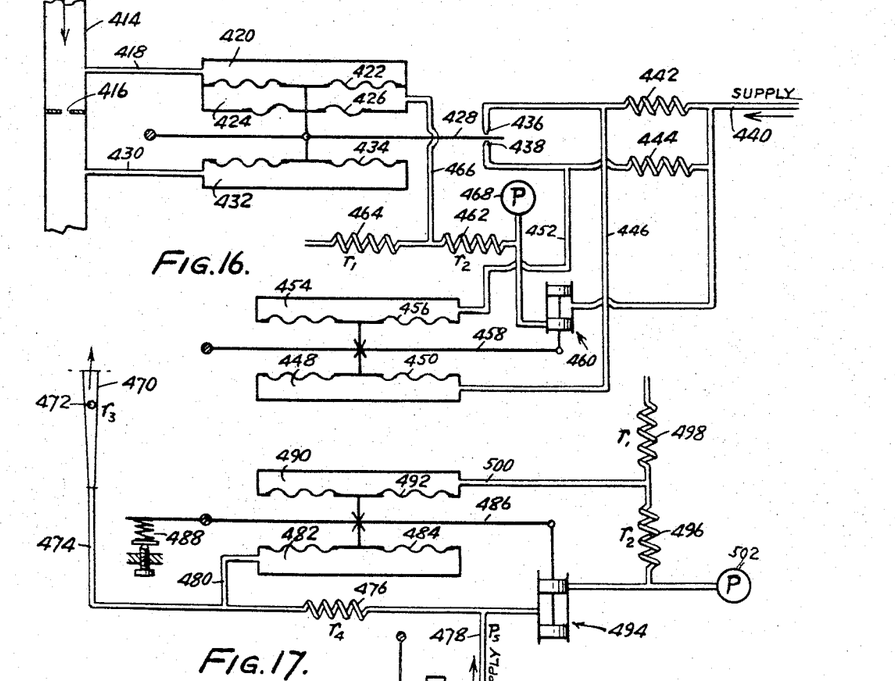
Figure 16 is a diagram showing an alternative application of the invention to flow measurement.
Figure 17 is a diagram illustrating application of the invention to the detection of position of a movable element.

In Figure 16 a conduit 414 is provided with an orifice 416 with connections similar to those of Figure 15 to a diaphragm arrangement. These connections involve an upstream connection 418 to a chamber 420 separated from a chamber 424 by a diaphragm 422 the chamber 424 being closed by a smaller diaphragm 426. A downstream connection 430 communicates with a lower chamber 432 provided with diaphragm 434. All of the diaphragms are connected to each other and to a lever 428.

In the present case, however, the lever 428 does not directly operate a pilot valve. Instead, the free end of the lever 428 acts as a baffle lying between two orifices 436 and 438 which respectively receive air from a supply 440 through resistances 442 and 444. Orifice 436 is connected through a line 446 with a chamber 448 provided with a diaphragm 450 while orifice 438 is connected by a line 452 to a chamber 454 provided with diaphragm 456. The two diaphragms act oppositely upon a lever 458 which is connected to a pilot valve 460 of the type previously described receiving air from the supply source and delivering it through series resistances 462 and 464, the junction of which is connected by line 466 to the chamber 424. As in the modification of Figure 15 a gauge 468 indicates the pressure drop across the orifice.

The advantages of the last described system will be clear. First, the baffle arrangement is such that a movement of the order of 0.0001 inch is sufficient to operate the relay. Second, the pilot valve, while serving to provide the necessary useful pressure, is power operated and any friction existing therein can be readily overcome and has no effect whatever upon the sensitivity of the system. It may be noted that while this arrangement has been described with particular reference to flow meters, it is of very general application where any similar conditions arise, since the baffle may be made responsive to forces other than those produced by pressures as specifically indicated.

Figure 17 indicates an embodiment of the invention particularly adapted to respond to a variable resistance such as may be provided by a ball moving within a tapered tube in a system in which the position of the ball is to be indicated. The system is described with particular reference to a rotameter in the joint application of myself and Yilliam Melas, Serial No. 553,700, filed September 12, 1944, Patent No. 2,475,630, referred to above. For the present purposes it will be sufficient to refer to the fact that a ball such as 472 is displaced in a tapered tube 470 so as to provide a variable resistance through which air or other fluid may pass from a tube 474 through which it is connected to a resistance 476 receiving the fluid from a supply at 478. A connection 480 joins tube 474 with a chamber 482 which is closed by a diaphragm 484 arranged to act upon lever 486. A second chamber 490 is provided with a diaphragm 492 acting upon the same lever in opposition to the diaphragm 484. A spring 488, the compression of which is adjustable, acts upon the lever 486. Lever 486 controls the pilot valve 494 which receives fluid from the supply 478 and delivers it through the series resistances 496 and 498 which are connected at their junction by 500 to the chamber 490. A pressure gauge 502 indicates the position of the ball 472 or, more broadly, the resistance $r_3$, which may be otherwise provided, in accordance with the following equation:

$$(20) \quad P - P_A = \left(\frac{r_1 + r_2}{r_1}\right)\left\{(P_S - P_A)\left(\frac{r_3}{r_3 + r_4}\right) - F\right\}$$

In this arrangement the flow of fluid through connection 474 is nearly constant, the pressure drop across the variable resistance being negligible in comparison with that across 476.

Figure 18:
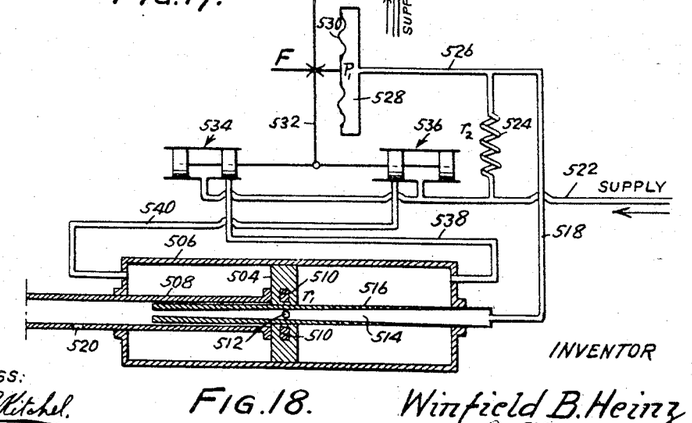
Figure 18 is a diagram showing the invention applied to the positioning of a power piston in accordance with the value of an applied force.

Figure 18 illustrates the application of the invention to the positioning of a power piston. In this arrangement a piston 504 in a cylinder 506 may exert forces through the hollow piston rod 508. Fitting in fluidtight fashion an opening in the piston is a tube 516 having a cylindrical outer surface but provided with a tapered bore 514 in which there moves a ball 512 made of magnetic material and adapted to be positioned by an arrangement of magnets 510 carried by the piston. Air is introduced in the right-hand end of tube 516 through a connection 518 which communicates with a supply line 522 through a resistance 524. Venting of the air to the atmosphere takes place through the opening 520 in the piston rod. The connection 518 communicates through tube 526 with chamber 528 provided with a diaphragm 530 through the medium of which a force is applied to a lever 532 in opposition to a force F. The lever 532 is mechanically connected to the valves 534 and 536 of the type previously described which receive air from the supply line 522 and deliver air under controlled pressure through the respective connections 538 and 540 to the opposite sides of the piston. It will be evident from discussions of the relay action heretofore given that the equilibrium position of the ball 512 will bear a fixed relationship to the force exerted at F. The result of this is that the piston will occupy a position in the cylinder which will be a function of the force F. This force F may be applied in any suitable fashion as, for example, by the pressure exerted in a chamber provided with a slack diaphragm and in view of the amplifying action involved it will be evident that a very small force or pressure may be caused to provide power positioning of the piston.

Figure 19:
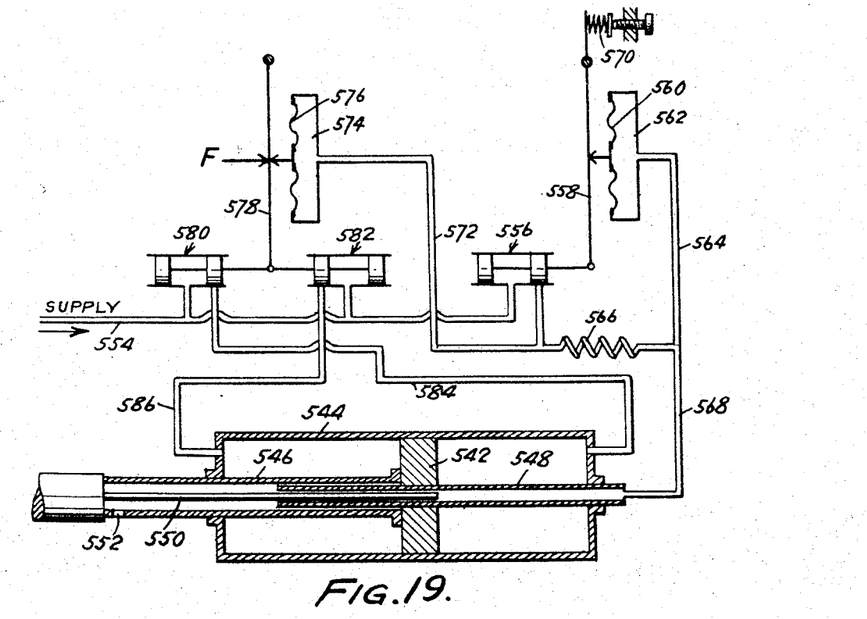
Figure 19 is a diagram showing an alternative mode of attainment of the same general result as that involved in Figure 18.

The modification illustrated in Figure 18 involves constant air flow past the variable resistance afforded by the ball in the tapered tube, the pressure drop across the resistance being variable. In the modification illustrated in Figure 19, the drop across the variable resistance is substantially constant while the air flow past it is variable. In Figure 19, a piston 542 moves in a cylinder 544 and is provided with a hollow piston rod 546, the bore in which and in the piston rod receives a fixed tube 548 which, in this case, is provided with a uniform cylindrical bore. To provide a variable resistance a rod 550 is carried by the piston rod and projects with quite small clearance into the bore of tube 548 to provide a variable resistance to flow. The bore of hollow piston rod is vented to the atmosphere at 552.

A supply line 554 provides air to a pilot valve 556 which is controlled by a lever 558 acted upon by the force exerted by the diaphragm 560 of a chamber 562 which is connected at 564 to one end of a fixed resistance 566 receiving the output from the pilot valve 556. Air flowing through the resistance 566 is lead to the bore of the tube 548 through connection 568. An adjustable force is applicable to the lever 558 through the adjustable spring arrangement indicated at 570.

The output from the pilot valve 556 is connected through line 572 with a chamber 574 provided with a diaphragm 576 arranged to exert on a lever 578 a force in opposition to an applied force F. The lever 578 controls pilot valves 580 and 582 which receive air from the supply line 554 and apply controlled pressures through connections 584 and 586 to the opposite sides of the piston 542. As will be evident from previous discussions, equilibrium requires that a particular resistance shall appear in the bore of the tube 548 for any given value of the force F. As in the case of the modification of Figure 18, therefore, the piston 542 will assume positions corresponding to this force under the application of substantial pressures to exert forces greatly in excess of the force applied at F.

fitting in only one relative position of the ports and connector element.

3. A fluid pressure relay comprising a housing, a pilot valve within the housing, a plurality of elements within the housing responsive to fluid pressure and mechanically connected to said valve, and exterior ports communicating with said elements and said pilot valve, said exterior ports being arranged to fit cooperating ports of a connector, and means arranged to allow said fitting in only one relative position of the ports and connector elements.

4. In combination, a pair of relay assemblies each comprising at least two fluid resistances arranged in series, an element responsive to fluid pressure and means providing communication between a junction of said resistances and said element, means providing pressure gradients across both sets of resistances, each of said relay assemblies having means controlled by its element for controlling flow through its set of resistances, the second relay having an additional element responsive to fluid pressure and arranged to coact with the first mentioned element thereof, and means providing communication between said resistance set of the first relay and said additional element of the second relay.

5. In combination, at least two fluid resistances arranged in series, means providing a pressure gradient across said resistances to produce flow therethrough, means for controlling flow through said resistances, means responsive to the pressure existing at a junction of said resistances to control said flow controlling means, means providing a fluid capacitance, a third resistance joining the pair of resistances forming said junction to said means providing a fluid capacitance, means responsive to a pressure gradient across the third resistance to control said flow controlling means, and means for applying a further force to control said flow controlling means.

6. In combination, at least two fluid resistances arranged in series, means providing a pressure gradient across said resistances to produce flow therethrough, means for controlling flow through said resistances, means responsive to the pressure existing at a junction of said resistances to control said flow controlling means, a third resistance joined to the pair of resistances forming such junction, means responsive to a pressure gradient across the third resistance to control said flow controlling means, and means for applying a further force to control said flow controlling means.

7. In combination, at least two fluid resistances arranged in series, means providing a pressure gradient across said resistances to produce flow therethrough, means for controlling flow through said resistances, means responsive to the pressure existing at a junction of said resistances to control said flow controlling means, means providing a fluid capacitance, a third resistance joining the upstream end of the pair of resistances forming said junction to said means providing a fluid capacitance, and means responsive to a pressure gradient across the third resistance to control said flow controlling means.

8. In combination, at least two fluid resistances arranged in series, means providing a pressure gradient across said resistances to produce flow therethrough, means for controlling flow through said resistances, means responsive to the pressure existing at a junction of said resistances to control said flow controlling means, a third resistance joined to the upstream end of the pair of resistances forming said junction, and means responsive to a pressure gradient across the third resistance to control said flow controlling means.

9. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of pressure within the chamber, means providing communication between a junction of said resistances and said chamber, and means mechanically directly connected to said wall and solely responsive to small movements thereof for controlling flow through said resistances to maintain balance between the forces exerted on said wall due to pressure within said chamber and due to said external force.

10. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of the pressure within the chamber, means providing communication between a junction of said resistances and said chamber, and means mechanically directly connected to said wall and solely responsive to small movements thereof for controlling flow through said resistances to maintain balance between the forces exerted on said wall due to pressure within said chamber and due to said external force, the last mentioned means being constructed and arranged so that movements of said wall are very small for large variations in said external force.

11. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of pressure within the chamber, means providing communication between a junction of said resistances and said chamber, and means mechanically directly connected to said wall and solely responsive to small movements thereof for controlling flow through said resistances to maintain balance between the forces exerted on said wall due to pressure within said chamber and due to said external force, at least one of said resistances being variable while the other remains mechanically unchanged.

12. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of pressure within the chamber, means providing communication between a junction of said resistances and said chamber, and means mechanically directly connected to said wall and solely responsive to small movements thereof for controlling flow through said resistances to maintain balance between the forces exerted on said wall due to pressure within said chamber and due to said external force, said wall being without substantial stiffness.

13. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of pressure within the chamber, means providing communication between a junction of said resistances and said chamber, and means mechanically directly connected to said wall and solely responsive to small movement thereof for controlling flow through said resistances to maintain balance between the forces exerted on said wall due to pressure within said chamber and due to said external force, said flow controlling means including a valve of the supply and waste type.

14. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of pressure within the chamber, means providing communication between a junction of said resistances and said chamber, means mechanically directly connected to said wall and solely responsive to small movements thereof for controlling flow through said resistances to maintain balance between the forces exerted on said wall due to pressure within said chamber and due to said external force, means providing a fluid capacitance, a third resistance joining the pair of resistances forming said junction to said means providing a fluid capacitance, and means responsive to a pressure gradient across the third resistance to control additionally movements of said wall and said flow controlling means.

15. In combination, at least two fluid resistances arranged in series, means providing a pressure gradient across said resistances to produce flow therethrough, means providing a chamber having a wall movable in response to fluid pressure in the chamber, means providing an external independently variable force opposing movement of said chamber wall under the application of pressure within the chamber, means providing communication between a junction of said resistances and said chamber, means mechanically directly connected to said wall and solely responsive to small movements thereof for controlling flow through said resistances to maintain balance between the forces exerted on said wall due to pressure within said chamber and due to said external force, a third resistance joined to the pair of resistances forming said junction, and means responsive to a pressure gradient across the third resistance to control additionally movements of said wall and said flow controlling means.

16. In combination, a pair of fluid pressure amplifiers each comprising means for delivering, in response to a lower pressure input, an amplified fluid pressure substantially continuously proportional to the lower pressure input with a fixed constant of proportionality greater than one, and means for feeding to the input of the second amplifier the amplified fluid pressure from the first.

WINFIELD B. HEINZ.

References Cited in the file of this patent

UNITED STATES PATENTS

| Number | Name | Date |
|---|---|---|
| 2,016,824 | Smith | Oct. 8, 1935 |
| 2,117,800 | Harrison | May 17, 1938 |
| 2,248,322 | Annin | July 8, 1941 |
| 2,290,987 | Moore | July 28, 1942 |
| 2,354,423 | Rosenberger | July 25, 1944 |
| 2,356,970 | Brockett | Aug. 29, 1944 |
| 2,360,889 | Philbrick | Oct. 24, 1944 |
| 2,441,405 | Fitch | May 11, 1948 |

FOREIGN PATENTS

| Number | Country | Date |
|---|---|---|
| 421,815 | Great Britain | Jan. 1, 1935 |

OTHER REFERENCES

Figure 20:
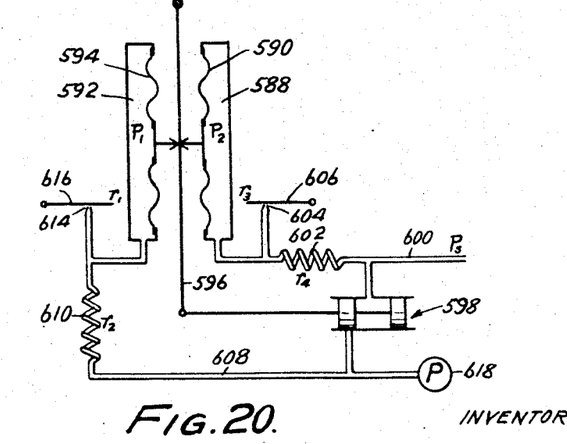
Figure 20 is a diagram showing the invention applied to the securing of a function of a plurality of independent variables.
Figure 21:
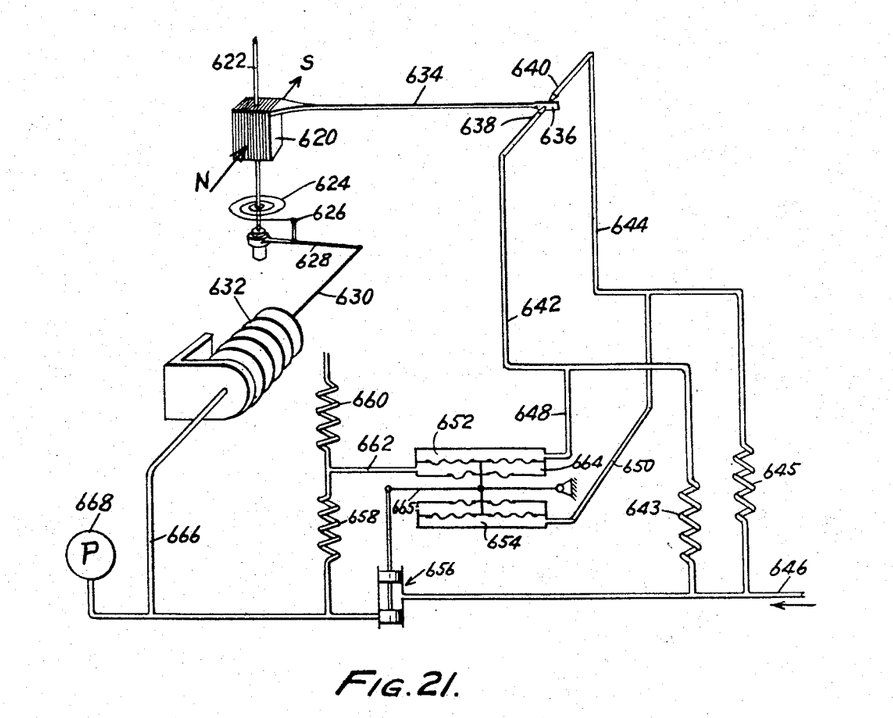
Figure 21 is a diagram illustrating a servo-mechanism creating an output pressure proportional to a potential applied to a galvanometer.
Figure 22:
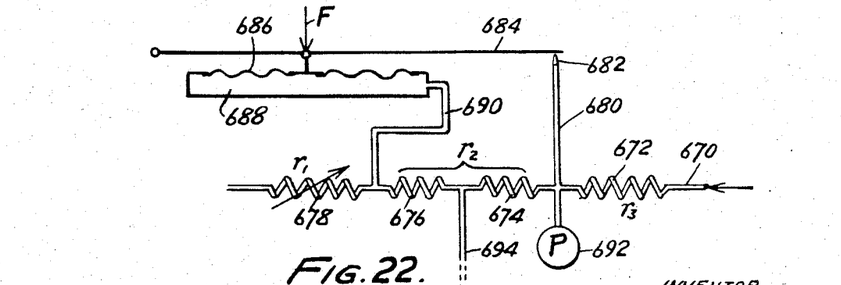
Figure 22 is a diagram illustrating the use of a nozzle and baffle arrangement instead of a pilot valve in carrying out the invention.
Figure 23:
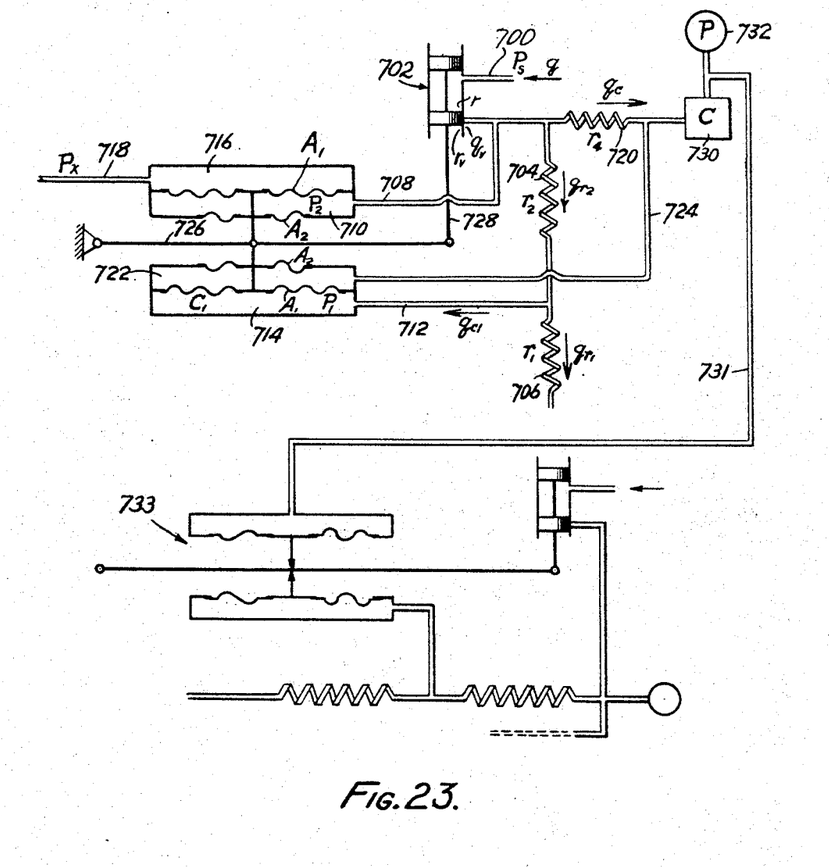
Figure 23 illustrates a form of apparatus provided in accordance with the invention and having certain dynamic characteristics.

"Relay Devices . . ." by H. Ziebolz, published by the Askania Regulator Co., volume I (text), pages 9, 10, 23 and 24; volume II (diagrams), Figs. 19, 20 (page 5), Fig. 21 (page 6), and Figs. 61, 62 (page 16).